April 28, 1931.     O. F. CARLSON     1,802,335
STONE DEFLECTING MEANS FOR LOW CUT HARVESTERS
Filed May 14, 1928     2 Sheets-Sheet 2
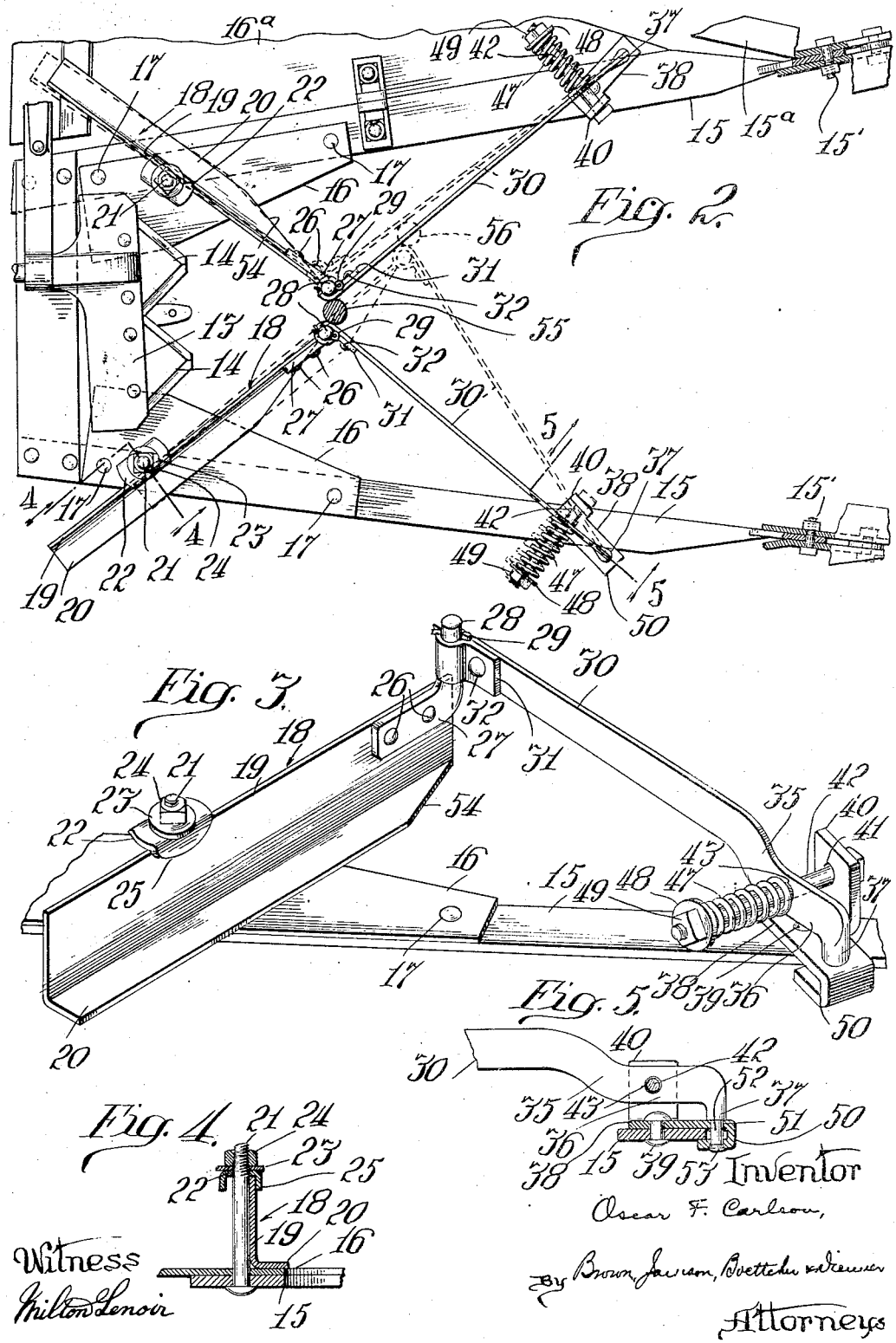

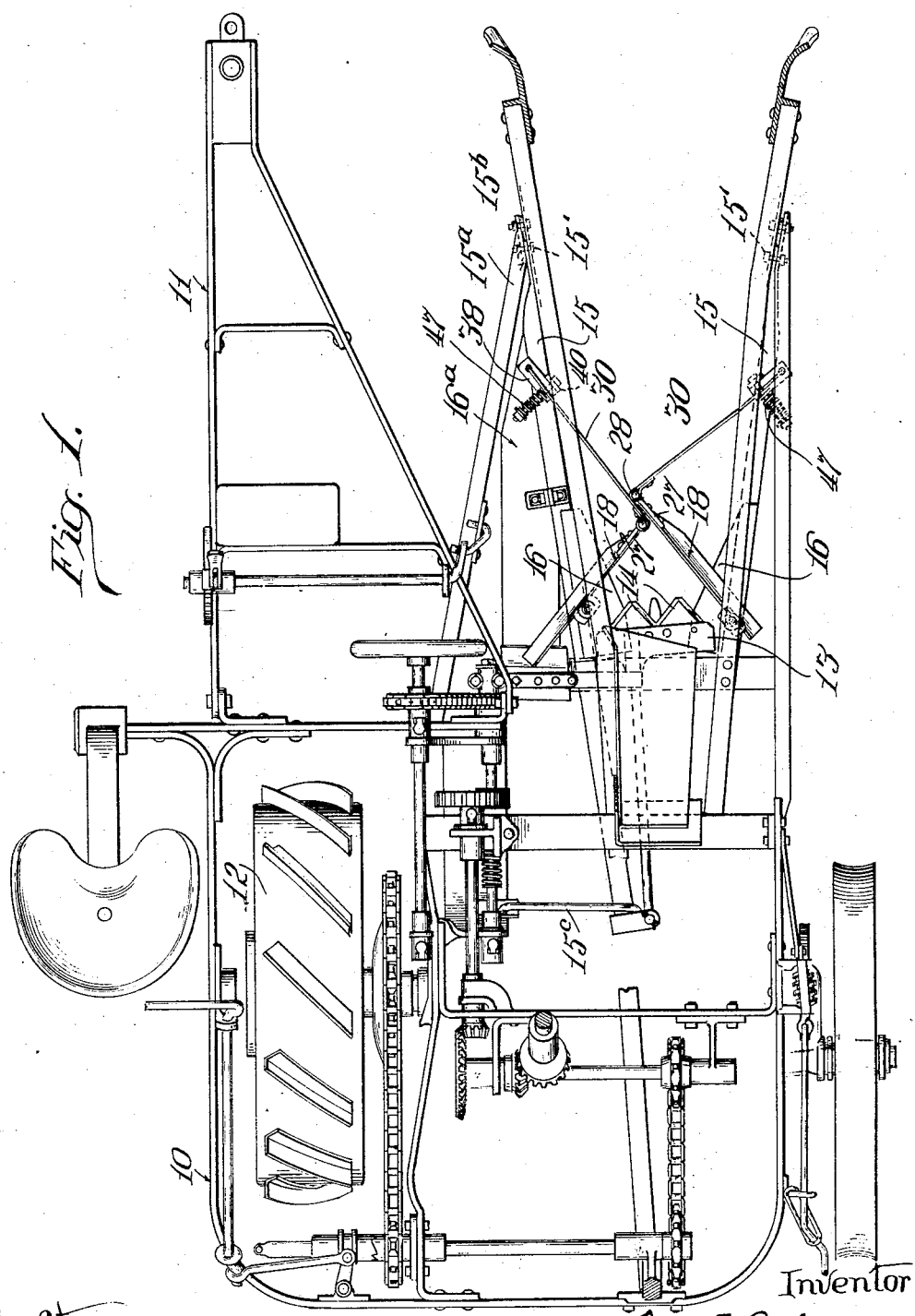

Patented Apr. 28, 1931

1,802,335

UNITED STATES PATENT OFFICE

OSCAR F. CARLSON, OF MOLINE, ILLINOIS, ASSIGNOR TO DEERE & COMPANY, OF MOLINE, ILLINOIS, A CORPORATION OF ILLINOIS

STONE-DEFLECTING MEANS FOR LOW-CUT HARVESTERS

Application filed May 14, 1928. Serial No. 277,534.

This invention relates to corn harvesters and particularly to a stone or other obstacle deflecting means for a corn harvester so arranged and combined therewith as to make a unitary cooperating mechanism.

The object of my invention is to provide such a device which will deflect stones, clods, and the like, and smooth off the ground directly in front of the sickle bar so that the corn stalk may be cut virtually at the ground level without undue damage to the sickle. The cutting of the corn stalk at or near the ground level has become necessary in order to combat the ravaging insect commonly known as the corn borer which frequently lives in the lower part of the corn stalk, near the ground level.

It has not been practical heretofore to adjust the sickle bar low enough to cut the corn stalks close to the ground, on account of the unevenness of the ground and various obstacles such as stones, which would constantly lodge into the sickle and greatly damage, dull or break the same, such difficulty being particularly present in stony soils. This difficulty is avoided by the use of my invention, arranged to deflect obstacles and level off uneven portions of the ground, leaving a smooth, clear space along the corn row and permitting unobstructed operation of the sickle, when adjusted to substantially the ground level.

My invention comprises yieldingly held floating deflector bars pivotally secured to guide members which are positioned in a higher plane than the deflector bars, such that they will be shifted by engagement with growing corn and permit the same to pass to the sickle, whereas obstacles will pass beneath the guide members and engage the forward side of the deflector bars and thereby be thrown from the path of the knife or sickle.

While the principal utility of the present stone deflecting means resides in corn harvesters, it will be understood that the invention is not limited thereto but can also be used in other types of implements where the same problem of removing stones and other obstructions is involved.

In order that those skilled in the art may more clearly understand my invention and be able to construct the same, I have shown in the accompanying drawings a specific illustration of the invention embodied in a corn harvester.

In the drawings:

Fig. 1 is a horizontal fragmentary view of the corn harvester, the stalk feeding chains, binder mechanism, etc., being omitted to avoid obscuring the illustration;

Fig. 2 is an enlarged fragmentary view illustrating the operation of my invention;

Fig. 3 is an enlarged perspective view showing more in detail the construction of my invention;

Figs. 4 and 5 are detail sectional views taken respectively on the lines 4—4 and 5—5 of Fig. 2, illustrating the means for operatively securing the deflector plates and the guide members in operative position.

The corn harvester shown in Figure 1 may be of any well known type and preferably comprises a main frame 10, a draw bar 11, attached to the front end thereof and arranged to be drawn by a tractor or other suitable form of power. A traction wheel 12 is operatively connected to suitable driving mechanism for operating the sickle bar 13 and the knives or sickles 14 secured thereto, and arranged in the throat of the divergent gathering arms 15 for cutting the corn stalks as they pass between said arms.

Stationary knives 16 are secured on the gathering arms 15 by bolts 17, and they cooperate with the movable knives in cutting the corn stalks. The gathering arms 15 are pivoted by bolts 15' to members 15a and 15b which are rigid with the frame, and the rear end of the longer arm 15 is held by a link 15c from lateral movement, and permitted vertical oscillation. A soil sled 16a is secured to one of the arms 15 and is arranged there below so that it engages the ground and supports the entire cutting mechanism as a unit floating on the soil. This arrangement permits the cutting of corn at uniform distance above the soil, regardless of the unevenness of the same.

The convergent deflecting plates 18 consist of angle bars each having a wide vertical flange 19 and a narower horizontal flange 20 which is seated on the stationary knife 16 and movable relative thereto.

A pivot bolt 21 passes upwardly through the arms 15 and knife 16 as indicated in Figures 2 and 3. A channel shaped guide 22 is fitted on the bolt 21, and the same engages over the upper edge of flange 19 on the deflector plate for guiding the plate as it moves longitudinally and rotates about the bolt 21 as an axis. A washer 23 and nut 24 on the bolt 21 secure the guide member 22 as shown with the downwardly turned flange 25 engaging over the upper edge of plate 18.

Adjacent the forward and inward end of the member 18 is secured as by bolts 26 an L-shaped plate 27 terminating in a cylindrical upstanding portion 28 forming a pivot stud and having a cotter pin 29 through the same. The guide members 30 comprise flat steel bars substantially rectangular in cross section, throughout the main portion of their lengths. The rearward end 31 of each bar 30 is folded over or bent upon itself in the manner shown and secured by rivet 32 thereby providing a cylindrical loop arranged to fit over the pivot stud 28 for moving the same when the bar 30 is oscillated about its forward end as an axis.

The greater portion of the guide member 30 is so formed and mounted as to ride higher from the ground than does the plate 18 and the forward end 35 is curved downwardly. It is then so curved as to pass parallel with the ground at 36 and it finally terminates in a downwardly extending cylindrical portion 37 which forms an axis about which the member 30 is adapted to oscillate.

On each arm 15 is secured a plate 38 by bolt 39. One side of the plate 38 is provided with an upwardly turned flange 40 having an opening 41 therein through which is loosely fitted a bolt 42 passing in a horizontal plane through an opening 43 in the portion 36 of the member 30.

A coil spring 47 positioned on the outer end of bolt 42 is held in place by a washer 48 and a nut 49 in such manner that it constantly urges against the plate 30 for moving it inwardly. The outer end 50 of plate 38 is bent downwardly and doubles upon itself so that it engages beneath the arms 15 for reinforcing and securing the plate 38 more firmly in position.

The doubled portion 50 of the plate 38 is provided with an opening 51 through which a pivot pin 52 extends, and is riveted over on the lower end at 53 to prevent its displacement. The pin 52 may be formed integral with the cylindrical portion 37 or it may be rigidly secured thereto in any suitable manner.

By this arrangement it will be apparent that when the guide bar 30 engages a stalk of corn, some inches above the ground, the bar will be deflected against the resistance of spring 47 and permit the stalks to pass to the sickle bar. On the other hand if an obstacle presents itself in the path of the knives, I have so tapered the inner end portion 54 of the base flange 20 on member 18, so that the obstacle or obstruction will be solidly engaged by this portion and be deflected out of the path of the knives.

The bar 30 is placed high enough to pass over the obstruction, whereas the bottom flange of the guard plate is on a level with the knives and therefore clears the path of such objects that pass beneath the bar 30.

In Figure 2 I have illustrated two stalks of corn 55 and 56, and illustrate the floating action of the guide members to accommodate the corn even though it may not be planted in a straight row, and it will be noted that the pivotal movement of each bar 30 presents little resistance to the passage of the corn stalks, but the members 18 both shift and overlap as shown in dotted outline, so that little opportunity is afforded for the passage of stones or clods, and when such are engaged by the tapered flange portion 54, they are forcefully cleared from the pathway.

It will be apparent to those skilled in the art that the general construction of the device is susceptible of variations without departing from the spirit of the invention, and I do not intend to be limited to the details herein illustrated and described but desire to avail myself of such variations and modifications as come within the scope of the appended claims.

I claim as my invention:

1. In combination with a corn harvester, of gathering arms and means for cutting corn stalks, stone deflecting means positioned in front of said cutting means, and guide bars arranged to shift the forward ends of said deflectors to permit the passage of corn stalks therebetween.

2. In combination with a corn harvester having corn gathering arms, and corn cutting means, of stone deflecting means positioned forwardly of said cutting means and in the same horizontal plane therewith, yieldingly held guide members pivoted to said deflector means for automatically shifting the forward end thereof for permitting the passage of corn stalks.

3. In a corn harvester, knives for cutting corn stalks at substantially ground level, gathering arms between which said knives reciprocate, stone deflectors positioned in a horizontal plane with said knives, and forwardly thereof for clearing the path of said knives and means for automatically shifting said deflector for accommodating stalks of corn.

4. In a corn harvester, the combination of knives for cutting corn stalks at substantially the level of the ground, means in the plane of said knives for deflecting stones from the path thereof, and guiding and shifting means for said stone deflecting means.

5. In a corn harvester, the combination of knives for cutting corn stalks at substantially the level of the ground, means in the plane of said knives for deflecting stones from the path thereof, guiding and shifting means for said stone deflecting means, said stone deflecting means comprising longitudinally movable convergingly mounted angle bars, having upwardly and forwardly extending flanges and pivot studs on the forward ends of said deflectors secured to said guiding and shifting means.

6. In a corn harvester, the combination of knives for cutting corn stalks at substantially ground level, means in the path of said knives for deflecting stones from the path thereof, guiding and shifting means for said stone deflecting means, said shifting means comprising bars pivotally secured and divergingly arranged forwardly of said deflectors and in a plane above the same, means yieldingly retaining the rear ends thereof in engagement with each other, said rear ends being pivotally secured to the forward ends of said deflectors.

7. In a corn harvester, the combination of knives for cutting corn stalks at substantially ground level, means in the plane of said knives for deflecting stones from the path thereof, guiding and shifting means for said stone deflecting means, said stone deflecting means comprising longitudinally movable convergingly mounted angle bars having upwardly and forwardly extending flanges, pivoted on the forward ends of said deflectors secured to said guiding and shifting means, said guiding and shifting means comprising bars divergingly mounted and pivotally secured at their forward ends, and yielding means spaced from the forward ends thereof for urging the rear end into engagement with each other for shifting said deflectors.

8. In a corn harvester comprising in combination, corn gathering arms, knives for cutting corn at substantially ground level, angle bars seated on said gathering arms and convergingly arranged transversely thereof, pivot bolts passing through said arms and having channel members thereon engaging over the upper edge of said angle bars, and permitting pivotal and longitudinal movement thereof, and means for guiding the forward ends of said angle bars for permitting the passage of corn stalks therebetween.

9. In a corn harvester comprising in combination, corn gathering arms, knives for cutting corn stalks at substantially ground level, angle bars seated on said gathering arms and convergingly arranged transversely thereof, pivot bolts passing through said arms and having channel members thereon engaging over the upper edge of said angle bars, and permitting pivotal and longitudinal movement thereof, one flange of said angle bars forming base members, the forward end of said base members being tapered to a point and arranged to engage stones in the pathway of said knives, and means for guiding the forward ends of said angle bars for permitting the passage of corn stalks therebetween.

10. In a corn harvester comprising in combination, corn gathering arms, knives for cutting corn stalks at substantially ground level, angle bars seated on said gathering arms and convergingly arranged transversely thereof, pivot bolts passing through said arms and having channel members thereon engaging over the upper edge of said angle bars, and permitting pivotal and longitudinal movement thereof, one flange of said angle bars forming base members, the forward end of said base members being tapered to a point and arranged to engage stones in the pathway of said knives, and means for guiding the forward ends of said angle bars for permitting the passage of corn stalks therebetween, said guiding means comprising bars pivotally secured to the forward ends of said deflectors and diverging to the gathering arms, plate members on said gathering arms rigidly secured thereto, said guiding means being pivoted to said plates, means on said plates spaced from the forward ends of said guiding means and yieldingly urging the rear ends of said guiding means inwardly.

11. In a harvester, the combination of gathering arms, plant cutting mechanism arranged to float as a unit on the soil, a soil sled therefor and stone deflecting means extending across and in front of said cutting mechanism and carried by said floating unit.

12. In a harvester, the combination of plant cutting mechanism arranged to float as a unit on the soil, said mechanism comprising plant gathering arms, cooperating cutting knives, a soil sled therefor, stone deflecting mechanism on said gathering arms and means arranged to be engaged by the plants for shifting said deflecting means and permitting the passage of said plants.

13. In a harvester, the combination of plant cutting means, stone deflecting means extending entirely across the plant contacting portion of and arranged forwardly of said cutting means, said deflecting means comprising guide members convergingly arranged to substantially an apex, and having escaping surfaces on the outer side thereof, and means by which the members are shifted for permitting the passage of plants through said apex.

14. In a harvester, the combination of plant cutting means, stone deflecting means arranged forwardly of said cutting means, said deflecting means comprising guard members convergingly arranged to substantially an apex, and having escaping surfaces on the outer sides thereof, and yieldingly held shifting bars arranged upon engagement with plants to shift said apex and permit the escape of plants therethrough.

15. In a harvester having a cutter, the combination of means for deflecting obstacles from the plant rows, said means including deflector members converging forwardly in front of the cutter and presenting an apex to the line of travel, and means for shifting one of the members to provide a passage for the plants.

16. In a harvester having a cutter, the combination of means for deflecting obstacles from the plant rows, said means including deflector members converging forwardly in front of the cutter and presenting an apex to the line of travel, and means for permitting the plants to escape said deflecting means and comprising pivoted bars connected to said deflector members and arranged above the plane of the latter.

17. In a harvester having a cutter, the combination of means for deflecting obstacles from the plant rows, said means including deflector members converging forwardly in front of the cutter and presenting an apex to the line of travel, means movably supporting the deflector members with respect to the harvester, and means connected to said deflector members to extend above the plane of the latter and adapted to be contacted by said plants.

In witness whereof, I hereunto subscribe my name this 4th day of May, 1928.

OSCAR F. CARLSON.